US011945709B2

(12) United States Patent
Zanette

(10) Patent No.: US 11,945,709 B2
(45) Date of Patent: Apr. 2, 2024

(54) METHOD AND APPARATUS FOR DISPENSING A BEVERAGE CHILLED CONDITION

(71) Applicant: ZANETTE & SONS PTY LTD, Hoppers Crossing (AU)

(72) Inventor: Alex Zanette, Hoppers Crossing (AU)

( * ) Notice: Subject to any disclaimer, the term of this patent is extended or adjusted under 35 U.S.C. 154(b) by 145 days.

(21) Appl. No.: 17/420,068

(22) PCT Filed: Dec. 23, 2019

(86) PCT No.: PCT/AU2019/051428

§ 371 (c)(1),
(2) Date: Jun. 30, 2021

(87) PCT Pub. No.: WO2020/140135

PCT Pub. Date: Jul. 9, 2020

(65) Prior Publication Data

US 2022/0081276 A1 Mar. 17, 2022

(30) Foreign Application Priority Data

Dec. 31, 2018 (AU) ................................ 2018904963

(51) Int. Cl.
*B67D 1/08* (2006.01)
*B67D 1/00* (2006.01)
(Continued)

(52) U.S. Cl.
CPC ......... *B67D 1/0862* (2013.01); *B67D 1/0004* (2013.01); *F25D 31/002* (2013.01);
(Continued)

(58) Field of Classification Search
CPC ................. F25D 31/006; F25D 31/002; F25D 2331/805; F25D 2400/12; F25D 2400/20;
(Continued)

(56) References Cited

U.S. PATENT DOCUMENTS

| | | | | |
|---|---|---|---|---|
| 1,822,250 A * | 9/1931 | Taylor | F25D 31/006 62/394 |
| 1,942,741 A * | 1/1934 | Austin | F25D 31/006 62/297 |

(Continued)

FOREIGN PATENT DOCUMENTS

| | | | | |
|---|---|---|---|---|
| DE | 1776087 * | 10/1971 | B67D 1/0864 |
| WO | 2006103566 A2 | 10/2006 | |
| WO | 2008006120 A2 | 1/2008 | |

OTHER PUBLICATIONS

English language translation of DE 1776087. Translated Apr. 2023 (Year: 1971).*

(Continued)

*Primary Examiner* — Cassey D Bauer
(74) *Attorney, Agent, or Firm* — Law Office of Jeff Williams PLLC; J. Oliver Williams

(57) ABSTRACT

A mobile beverage dispenser comprises a wheelable platform having mounted thereon a chillable chamber connected to a refrigerated cooling coil for removing heat from a beverage in a bulk storage container placed therein for cooling; and a beverage dispensing tap connectable to the container in fluid communication with the beverage, and mounted in thermally conductive relationship with the chillable chamber, whereby the chamber when chilled removes heat from the dispenser in preparation for dispensing of the beverage, by virtue of the conductive relationship.

8 Claims, 3 Drawing Sheets

(51) Int. Cl.

| | |
|---|---|
| ***B67D 1/04*** | (2006.01) |
| ***B67D 1/16*** | (2006.01) |
| ***F25D 31/00*** | (2006.01) |

(52) U.S. Cl.

CPC .... *F25D 31/006* (2013.01); *B67D 2001/0089* (2013.01); *B67D 2001/0092* (2013.01); *B67D 1/0418* (2013.01); *B67D 1/16* (2013.01); *B67D 2210/00139* (2013.01); *F25D 2331/805* (2013.01); *F25D 2400/12* (2013.01); *F25D 2400/20* (2013.01); *F25D 2400/38* (2013.01)

(58) Field of Classification Search

CPC ........... F25D 2400/38; B67D 1/0865–1/0868; B67D 1/0862; B67D 1/0004; B67D 2210/00139

See application file for complete search history.

(56) References Cited

U.S. PATENT DOCUMENTS

| | | | | |
|---|---|---|---|---|
| 2,001,040 | A | 5/1935 | Sweeney | |
| 2,159,729 | A | 5/1939 | Ribble | |
| 2,282,627 | A | 5/1942 | Weiss | |
| 2,917,906 | A * | 12/1959 | Woolley | F25D 31/006 62/457.2 |
| 3,308,636 | A | 3/1967 | Schaff | |
| 3,712,514 | A | 1/1973 | Leblanc | |
| 8,091,378 | B1 | 1/2012 | Farias, III et al. | |
| 2012/0325856 | A1 | 12/2012 | Ito | |
| 2017/0101301 | A1 | 4/2017 | Volin | |

OTHER PUBLICATIONS

International Search Report and Written Opinion in related PCT application No. PCT/AU2019/051428, dated Mar. 19, 2020, 8 pages.

International Preliminary Report on Patentability in related PCT application No. PCT/AU2019/051428, dated Dec. 21, 2020, 11 pages.

* cited by examiner (a)

(b)

METHOD AND APPARATUS FOR DISPENSING A BEVERAGE CHILLED CONDITION

TECHNICAL FIELD

This disclosure relates to apparatus for and a method of dispensing a chilled beverage especially from a mobile platform. In particular, the disclosure relates to the dispensing of chilled beer at a selected location.

BACKGROUND TO THE DISCLOSURE

A significant inconvenience borne by providers of beverages to end consumers relates to keeping beverages cool under hot environmental or climatic conditions, with indirect effects on the social fabric when the expectations of would-be consumers of the beverage once dispensed from a container are not met in respect of the anticipated degree of chilling. This is especially so in the case of beer being dispensed from a container such as a keg. Many cultures expect beer to be well chilled when it reaches the glass or mug or other receptacle of end use.

Australian patent number 2004100549 discloses a wheeled container in the shape of a keg, the inside of the keg-shaped container housing a refrigeration plant and a beer canister cooled by the refrigeration plant. The plant has to be plugged into a mains power source to become operational. The container is keg-shaped to be considered as an attractive piece of furniture when not in use. It is not intended for mobility. A drawback with the patent of this disclosure is that the dispenser is not able to be chilled except by the effect of the beverage passing through it. Should the dispenser not be in almost constant use, it will heat up in warm ambient conditions so that the next quantity of beverage dispensed will be unnecessarily heated, leading to diminishing of its cooling experience for the recipient. The operator of the dispenser may choose to run the dispensing tap for a few seconds to discharge a quantity of the relatively heated beverage in the dispensing conduit. This leads to wastage and loss.

U.S. Pat. No. 2,917,906 provides a wheeled carriage, pictured below defining a space within a housing within which are installed a gasser and a cooler unit. The unit is intended to be mobile for wheeling about to different locations for use. The housing is of wider diameter than the beer container (e.g. keg) to be placed within it, so that an annular space is left surrounding the container, into which space a refrigerant such as ice may be packed. The housing body has a wall that sweeps up at the rear to provide what may be used as a handle for tilting and pushing or pulling the trolley. A tap is mounted to a conduit passing through the housing, but the conduit is exposed to the elements, being susceptible to acquiring heat unnecessarily in the pipe run between the beer container and the tap.

U.S. Pat. No. 4,377,076 discloses a refrigerated cooling jacket but does not address the dispensing arrangement.

AU 1998074849 provides for a pre-chill maintenance of the liquid within its container and cooling of the liquid as it is dispensed through a liquid line of the liquid dispenser assembly. Dual stage cooling is achieved by the coolant bath fluid of the liquid dispenser assembly without resort to ice or cold packs.

U.S. Pat. No. 10,101,082 proposes a system for use in permanent structures in a bar-like environment, where kegs of beer are stored below a large counter and beer is dispensed by a means of a series of taps located remotely from the kegs and above the counter. The problem of heating of the tubing leading to the dispenser is addressed by providing an insulated tap tower, the chilled coolant flowing within the insulated tap tower and a cooling block therein.

U.S. Pat. No. 7,735,334 teaches of the desirability of having a dispensing tap in close proximity to, and in thermal contact with, the walls of a container within which the beer is held for cooling.

There is a need perceived by the present inventor for a mobile beer dispensing system in which a single cooling means is effective to cool both the beer and the dispensing equipment.

OBJECTS OF THE DISCLOSURE

To address the shortcomings of the prior art, it is intended to provide portable beverage cooling apparatus having means for keeping a beverage dispensing tap as well as the beverage in a cooled condition.

The preceding discussion of the background is intended to facilitate an understanding of the present disclosure. However, it should be appreciated that the discussion is not an acknowledgement or admission that any of the material referred to was part of the common general knowledge in Australia or elsewhere as at the priority date of the present application.

Further, and unless the context clearly requires otherwise, throughout the description and the claims, the words 'comprise', 'comprising', and the like are to be construed in the inclusive sense of "including, but not being limited to"—as opposed to an exclusive or exhaustive sense meaning "including this and nothing else".

SUMMARY OF DISCLOSURE

According to a first aspect of this disclosure, there is provided a mobile beverage dispenser comprising:

a. a wheelable platform having mounted thereon chiller means adapted for removing heat from a bulk storage container being borne on the platform and containing a beverage for cooling and b. beverage dispenser means connectable to the container in fluid communication with the beverage, and mounted in thermally conductive relationship with the chiller means, whereby the chiller means removes heat from the dispenser in preparation for dispensing of the beverage.

The chiller means preferably comprises a receptacle wherein the container is receivable for cooling an external surface thereof.

In a preferred embodiment of the disclosure, the receptacle is defined by a cylindrical wall.

In a further preferred embodiment, the chiller means comprises an evaporative cooling coil operatively located against and in thermally conductive relationship with the wall.

Further preferably, the chiller means comprises a refrigeration plant connected to the coil.

Preferably, the coil is located on the outside of the receptacle wall.

The dispenser means may comprise a tubular conduit passing through the receptacle wall.

In a preferred embodiment, the chiller of the disclosure further comprises a refrigerant expansion chamber connected in thermally conducting relationship with the tubular conduit.

The chamber is preferably in the form of a U-shaped tube having an inlet and an outlet respectively for receiving and discharging refrigerant.

The tubing through which refrigerant from the refrigerant plant flows is preferably configured for selectively bypassing the expansion chamber.

Preferably, the receptacle has an open top. The open top facilitates access to the beverage container when within.

Further preferably, the cylindrical wall is mounted generally orthogonally in relation to the platform.

Still further, the dispenser apparatus may comprise a housing mounted to the platform to cover the receptacle and chiller means.

In a preferred embodiment, the housing has an openable closure permitting access to the beverage container for replacement.

The dispenser means preferably comprises a tap operatively mounted externally on the housing.

In a further preferred embodiment, the tap is thermally conductive to be cooled by the chiller means.

Further according to the disclosure, the apparatus is preferably moveable to be relocated by hand. To this end, the dispenser comprises handle means mounted to the housing to be extensible therefrom for use and collapsible therein for stowage.

In a still further preferred embodiment, the dispenser may include an on-board power source for the chiller means. The power source preferably comprises a rechargeable energy storage battery.

According to a second aspect of the disclosure there is provided a method of dispensing a chilled beverage, the method comprising the steps of

- a. providing chiller apparatus comprising:
  - i. a chilling receptacle adapted for receiving therein in cooling relationship a bulk storage beverage container containing a beverage for dispensing, and
  - ii. a conduit connected to a dispensing tap wherein the conduit and tap are in thermally conductive relationship with the chilling receptacle,
- b. operating the apparatus to cause the receptacle to be cooled and to draw heat from the conduit and tap,
- c. placing the beverage container in the receptacle and allowing the container and its contents to cool,
- d. Connecting the container and tap in fluid communication,
- e. Operating the tap to dispense cooled beverage through the tap via the pre-cooled conduit.

In a preferred form of the disclosure, the receptacle comprises a cylindrical sleeve into which the container is insertable for cooling.

Preferably, the chiller apparatus comprises a refrigerated cooling coil arranged in thermal contact with an outside surface of the receptacle.

In a preferred embodiment, the conduit passes through the receptacle wall.

In a preferred embodiment of the method, the chiller apparatus further comprises a refrigerant expansion chamber connected in thermally conducting relationship with the conduit. Preferably, the chamber is in the form of a U-shaped tube having an inlet and an outlet for admitting and discharging refrigerant.

In a still further preferred embodiment, the method includes causing refrigerant selectively to bypass the expansion chamber when cooling of the conduit is not required.

The method may further include providing, and mounting the chilling apparatus on, a wheeled platform.

In an embodiment, the method includes providing and covering the chiller apparatus with a housing for fastening to the platform.

In a preferred embodiment, the method includes connecting the chiller means to an on-board power supply on the platform.

The method preferably further includes wheeling the chiller apparatus and beverage container to a location at which the beverage is to be dispensed.

According to a third aspect of the disclosure there is provided a mobile beverage chiller comprising a chillable receptacle mounted on a wheelable platform, the receptacle adapted for receiving a bulk beverage dispensing container, and beverage dispensing means operatively connectable to the container and in thermally conductive relationship with the receptacle to be cooled thereby.

In an embodiment, the receptacle comprises a sleeve into which the container is operatively locatable for chilling.

In the preferred embodiment, the receptacle is in thermally conductive contact with evaporative cooling means.

Preferably, the evaporative cooling means is located outside the receptacle.

Further preferably, the dispensing means is in thermally conductive contact with a refrigerant expansion chamber.

In a preferred embodiment, the dispensing means comprises a beverage receiving conduit that passes through a wall of the receptacle.

In a further embodiment, the expansion chamber is operatively located external to the receptacle.

Preferably, the expansion chamber comprises a U-shaped tube having legs between which the conduit is located to pass.

In a still further preferred form of the disclosure, the chiller also includes a controllable bypass circuit operable to cause refrigerant to bypass the chamber. When the refrigerant bypasses the chamber, the cooling effect on the beverage delivery conduit is reduced, allowing for the thawing, when necessary, of a beverage dispensing valve or tap.

BRIEF DESCRIPTION OF DRAWINGS

In order that the disclosure may be readily understood, and put into practical effect, reference will now be made to the accompanying figures. Thus.

DETAILED DESCRIPTION OF EMBODIMENTS

The following description and drawings are illustrative and are not to be construed as limiting. Numerous specific details are described to provide a thorough understanding of the presently disclosed embodiments. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. Moreover, various features are described which may be exhibited by some embodiments and not by others. Similarly, various requirements are described which may apply to certain embodiments but not necessarily to others.

Figure 1:
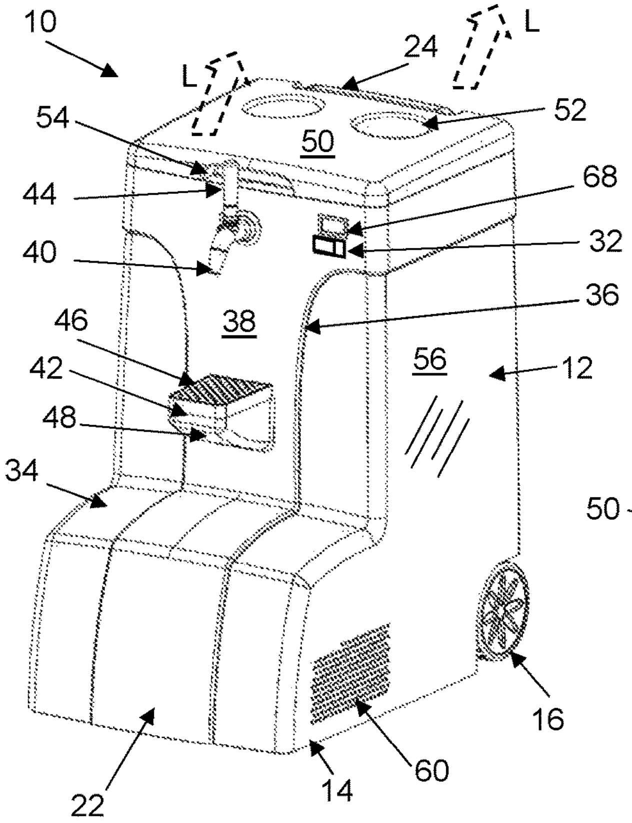
FIG. 1 shows in perspective front view, a mobile dispenser unit in a preferred embodiment of this disclosure.

Referring to FIG. 1, in a preferred embodiment of the apparatus of this disclosure, the mobile dispensing unit is generally denoted by the number 10 and shown in perspective view with a body defined by a protective housing 12 mounted by fastening means (not shown) over a platform 14. The fastening means may be of any suitable known kind, for example inter-engaging clip formations. The platform is rendered mobile by means of wheels 16 mounted to an enclosed axle assembly 18 at its rear end 20. Height adjustable stabilising feet (not shown) may be fitted below platform 14 adjacent the unit's front end 22. Weight adjustment may be by means of a screw-threaded connection between the feet and a threaded socket in the base.

Figure 2:
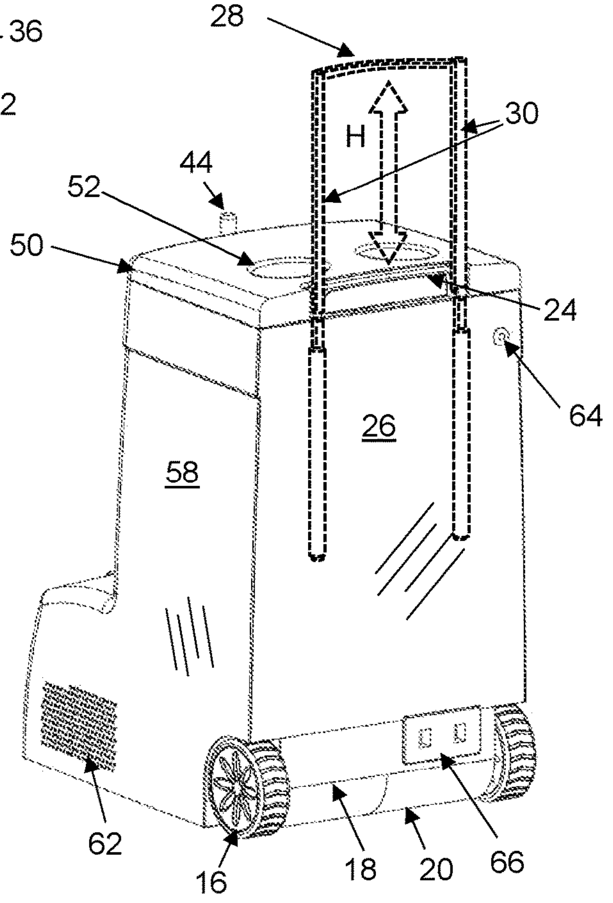
FIG. 2 is a perspective rear view of the unit of FIG. 1 with its pulling handle shown partly extended by stippled lines.

For use in relocating the unit, an extensible handle 24 of known kind is fitted slideably within the housing (see FIG. 2) to be located forward of rear housing wall 26. As shown by directional arrow H, the handle may be extracted from its normally stowed position in FIG. 1, so that the handgrip crossbar portion 28 stands proud of housing 12 on supporting legs 30 which are withdrawn from a stowed location in the housing for supporting portion 28 for use. A user may then find it convenient to tilt the housing rearwardly by means of the extended handle so that the forward portion of the platform and any supporting feet are clear of the supporting ground or floor surface and the unit is ready to be rolled to a new location on wheels 16.

It will be appreciated that the wheels in other embodiments may be of different configuration and need not be connected to a common axle. The handle assembly may also take on a different form. It is found however that the crossbar form is advantageous for the dispenser unit of the disclosure, because of the weight of the beverage container within (when relatively full) and of the refrigeration plant, which will be described in further paragraphs. Instead of a crossbar, the handle may take the form of a T-bar on a single withdrawable leg, or of two separate handgrips on withdrawable separate legs. The form of the handle should not be construed as a limitation on the scope of the disclosure.

In this embodiment, the housing is shown in a generally blocky shape with a protruding front step 34. It has external moulded formations 36 providing a decorative aspect while strengthening the general structure of the housing to be suitable for potentially robust handling. The mouldings may take other shapes within the scope of the disclosure.

Protruding from the upper front face 38 of the housing are a beverage dispensing tap 40 and a removable drip tray assembly 42 located directly below it, but sufficiently spaced from the tap to allow interposition of a beer glass, mug or similar receptacle thereon for filling from the tap. Tap 40 is opened and closed by means of a pull handle 44 of known operation. Alternative forms of tap operating devices may be substituted without departing from the scope of this disclosure. An example of an alternative tap is a rotatable faucet that opens and closes a ball valve, butterfly or needle-type valve and the like.

The drip tray assembly has a covering grid 46 located above a catchment basin 48, which is removably fitted in a mating formation for ease of emptying the basis.

Housing 12 has a removable lid 50 equipped with twin recesses 52 suitable for holding a beverage container such as a glass. A recess 54 is located at the front lip of the lid to enable an operator or user of the unit to insert one or more of their finger tips to prise the lid up and away from the generally vertical, supporting front 38, sides 56, 58 and rear 26 panels of the housing, to allow access to the interior components of FIG. 3, as indicated by directional arrows L.

In an alternative embodiment, the lid may be hingedly connected to one of the vertical panels of the housing without departing from the scope of the present disclosure. The lid may be rendered lockable by fitting a locking mechanism, for example a latch or magnetic retention device, or it may be provided with a suitable device for receiving a removable external locking device such as a padlock or combination lock.

To provide ventilation for the refrigeration plant installed within housing 12, ventilation grilles 60, 62 are provided on either side 56, 58.

Rear panel 26 has a port 64 for receiving tubing from an externally mountable additional or optional carbon dioxide supply cylinder or an external fluid feeder line (not shown). Also on the rear panel, situated near platform 14 is cover plate 66 for an on/off switch alongside a power cord socket, which is connected to the refrigeration plant circuitry to provide on/off functionality, for example while the apparatus is being wheeled to a selected dispensing location. Located adjacent tap 40 on front wall panel 38 is a slot 68 for mounting a digital thermostat display with adjustable temperature control, to provide an output of temperature within the chilled receptacle 80 of FIG. 4.

Figure 3:
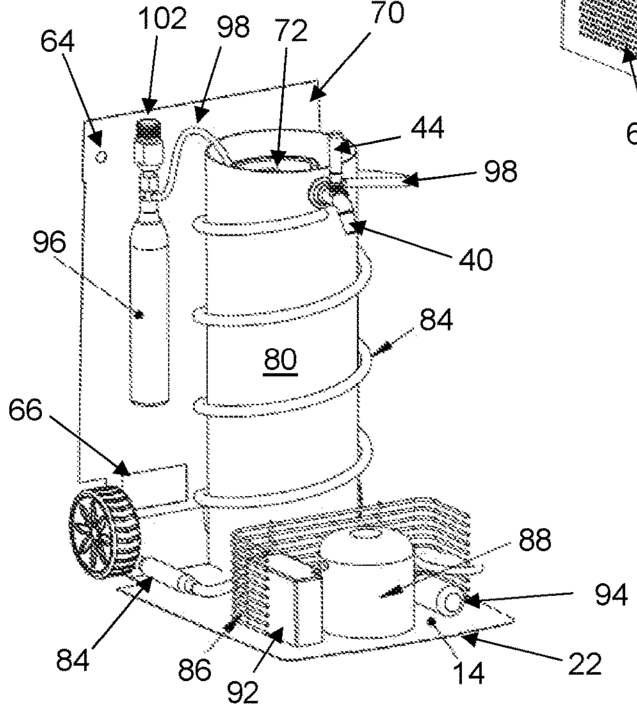
FIG. 3 is a perspective front view of unit of FIG. 1 with the housing removed to show internal components.

The internal components of the dispensing apparatus are described with reference to FIGS. 3 and 4, in which housing 12 has been removed, exposing platform 14 and an internal rear bulkhead panel 70, behind which the handle support legs 30 are stowed in a gap provided between panel 70 and rear wall 26, when the handle is not extended. The gap provides a layer of air that helps thermally insulate the interior of the housing from ambient conditions outside. The housing may be removed in the normal operating life of the unit for servicing, repairs or cleaning and the like.

Figure 4:
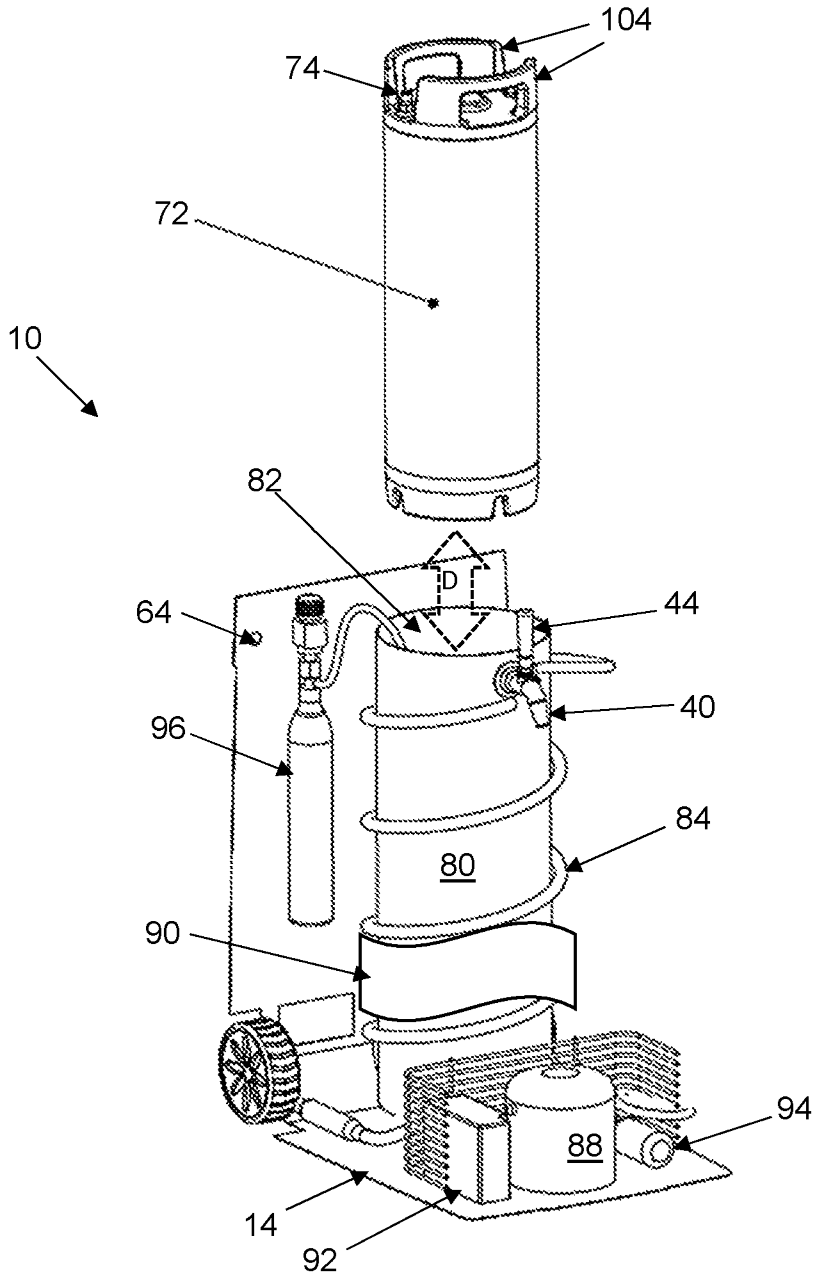
FIG. 4 is a perspective front view of unit of the unit of FIG. 3 showing a beverage canister withdrawn from the chiller sleeve.

With reference to FIG. 4, the bulk container for the beverage is in the form of a canister 72, which is able to be disconnected from the dispensing conduit 78 (shown in FIG. 5) at a standard coupling 74, so that it can be withdrawn from chilled receptacle 80 and replaced if required, for example if empty or for replacement with a canister containing a different beverage.

Securely mounted to platform 14 is the chillable, to become chilled, receptacle 80 of generally cylindrical, sleeve-like proportions. The proportions are such that canister 72 fits substantially snugly inside when inserted from above. However, canister 72 does not fit tightly against the inner surface 82 of receptacle 80, so that ease of withdrawal is ensured.

An evaporative cooling coil 84 is wound around the outer surface of receptacle 80 to be in substantially thermal conductive relationship therewith. Receptacle 80 is preferably made of copper, but can be made from another material having superior thermal conductivity. The heat from the receptacle is conducted to the coil to cause evaporation of the refrigerant therein according to conventional refrigeration principles. The coil is shielded from receiving external incident heat by covering it and receptacle 80 with an insulating blanket 90, shown being partially applied in FIG. 4 by being wound in strip form around the receptacle and coil. The blanket may be made of any suitable insulating material, for example of the kind provided for insulating piping, or it may be a substantially rigid cylinder of polystyrene walls or similar.

The chiller apparatus includes a refrigeration plant installed on platform 14, below the step portion 34 of housing 12 in FIG. 1. The refrigeration plant further includes a condenser 86, a compressor 88, a motor-driven cooling fan (not shown) mounted behind the compressor, a controller unit 92 including a microprocessor, and a filter and dryer unit 94, operatively connected for treating the refrigerant in the cooling circuit, according to known designs. The plant is powered by direct current received from an on-board rechargeable battery (not shown). In an alternative embodiment, the apparatus is adapted for receiving alternating current from a mains supply (110V or 220/240V) and includes a transformer and rectifier. In a further embodiment, the cooling plant may be adapted to be powered from a direct current source of 12V, 18V, 24V and the like. It will be appreciated that the disclosure allows for the use of various power supply solutions without being limited to the one described in this embodiment.

To provide frothing gas to the beverage being dispensed, a bottle 96 containing carbon dioxide is mounted to bulkhead 70. A tube 98 provides a conduit for carbonizing gas, for example carbon dioxide, released from the bottle to pass into canister 72 through an entry port (not shown) located on the cap, but obscured in FIG. 4 by oppositely located handles 104. The rate of release is accurately controllable by manually operable needle valve 102. Bottle 96 is disconnectable and replaceable when empty. As indicated by directional arrow D in FIG. 4, the canister 72, once disconnected from the conduit to dispensing tap connection 76 (see FIG. 5), can simply be lifted from copper sleeve 80 using handle formations 104 for easy replacement.

Figure 5:
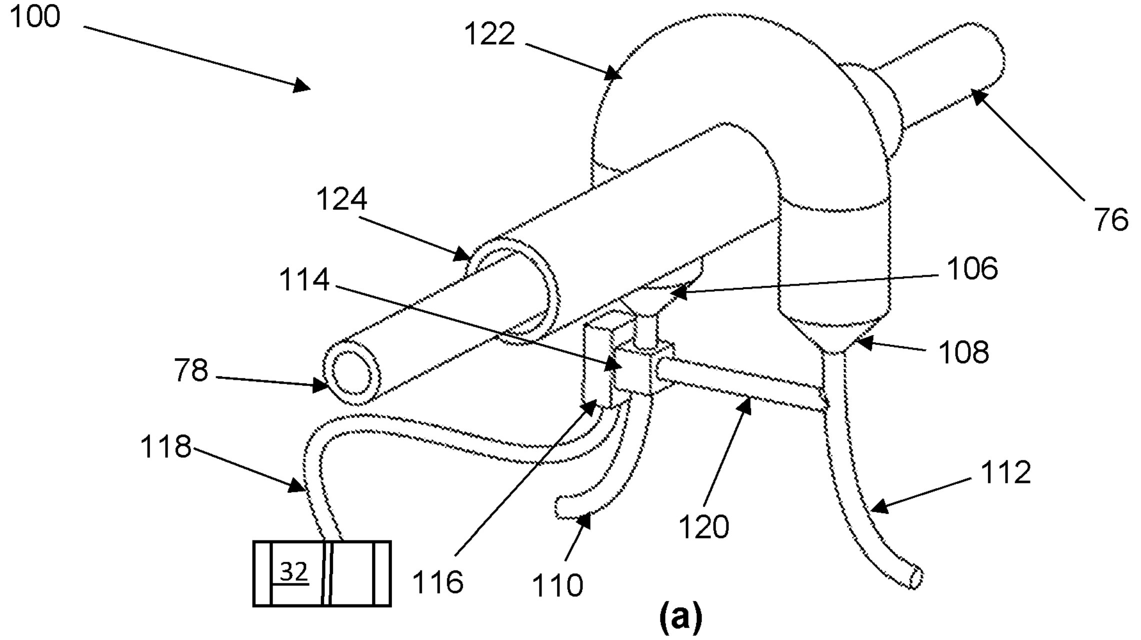
FIG. 5 is a schematic view of an expansion chamber for cooling the conduit leading to the dispensing tap of the apparatus of FIG. 1, shown in (a) in perspective and in (b) in end elevational views.
Figure 5:
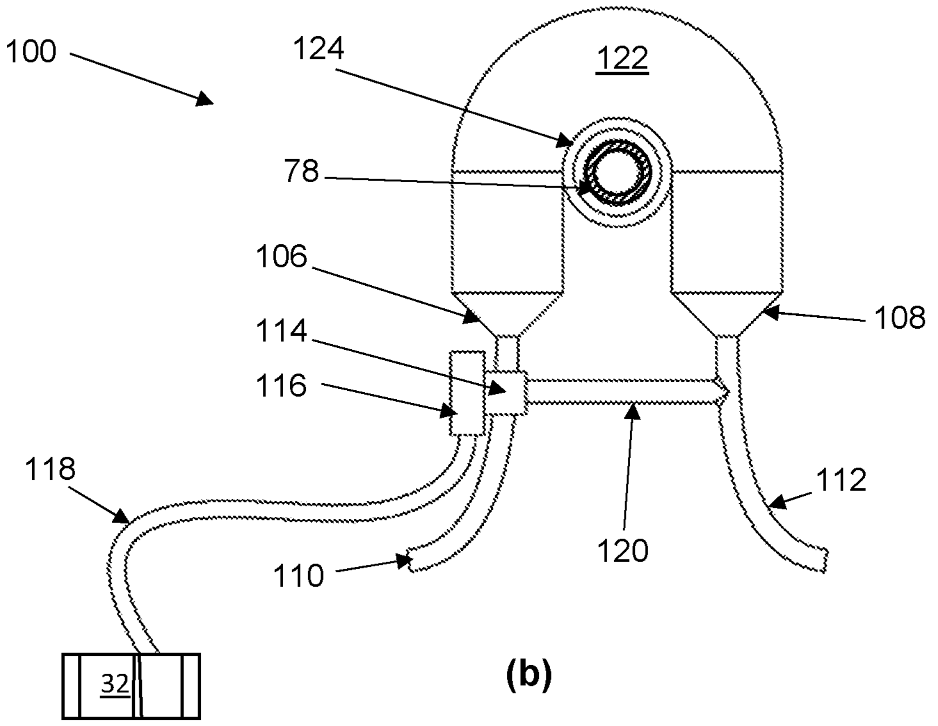

A further cooling arrangement that is included in the preferred embodiment and that operates to cool tap nozzle 40 and the dispensing tube immediately connected to it, is depicted schematically in FIG. 5 and designated generally by the numeral 100. The arrangement shown is not evident in the previous figures, as it is mounted within housing 12 to lie adjacent the outlet to tap nozzle 40 between cylinder wall 80 and housing wall 38. FIG. 5 shows the fluid dispensing tube that extends from its proximal end 78 to a threaded distal connector portion 76 that extends from tap assembly 40, 44 in conventional manner. From tap 40, dispensing line 76,78 bolts through front wall 38 of outer housing 12, into a mating threaded sheath 124, to establish fluid connection with beverage delivery tube 40. Proximal end 78 of tube 76 is connected to outlet coupling 74 atop canister 72 (see FIGS. 3 and 4). Copper sheath 124 passes between and is welded to the legs of a U-shaped hollow dryer and fluid expansion tube 122.

Expansion tube 122 is made of copper for optimal thermal conductivity and heat transfer from sheath 124 and has an expanding inlet 106 and a reducing outlet 108 connected respectively to feeder tube 110 and discharge tube 112. Tube 122 may have a flattened cross-sectional axial profile resembling an oval, so that it extends a greater distance along sheath 124 than its height that extends radially away from the sheath axis. This shape and geometry may be optimised to provide optimal heat transfer contact area.

Feeder tube 110 is connected to cooling coil 84 to receive refrigerant from compressor 88 through a three-way solenoid valve 114, operated via electronic controller 116 and discharge tube 112 connects back to compressor 88 to return heated and evaporated refrigerant.

Controller 116 is manually operable by a human operator by means of a toggle switch 32, connected to it by wiring 118 and to the power supply of the apparatus. The switch is located below the temperature indicator slot 68, as shown in FIG. 1, but could be placed at any convenient location on the exterior of the housing. The switch is operable to allow selective cooling of tube 76, 78 and tube 40 by means of U-tube 122. Under conditions when cooling is not required, solenoid valve 114 is operated to open bypass line 120 and close fluid flow to inlet 106, diverting refrigerant directly to return line 112 leading back to compressor 88. Refrigeration of line 76, 78, 40 may not be required when nozzle 40 is sufficiently cool not to require further cooling or under humid conditions when tap 44 and nozzle 40 are liable to ice up. Bypassing refrigerant does not flow back into U-tube 122 through reducing outlet 108 because of the suction caused by the partial vacuum generated by the compressor in the return line. The bypassing action allows a frozen tap mechanism to thaw if necessary In a further embodiment, controller 116 is in electronic communication via wiring 118 with the processor housed in the controller unit 92 (FIGS. 3 and 4) to allow automatic selective cooling of tube 78 and tube 40 by means of U-tube 122. Temperature sensors are installed on tap mechanism 40, 44 to establish a feedback loop for managing operation of the solenoid valve and the cooling effect generated by U-tube 122.

Throughout this specification, plural instances may implement components, operations, or structures described as a single instance. Although individual operations of one or more methods are illustrated and described as separate operations, one or more of the individual operations may be performed concurrently. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise programmable logic or circuitry (e.g. as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

In addition, use of the "a" or "an" are employed to describe elements and components of the embodiments herein. This is done merely for convenience and to give a general sense of the disclosure. This description should be read to include one, or at least one, and the singular also includes the plural, unless it is obvious that it is meant otherwise.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A mobile beverage dispenser comprising:

a. a wheelable platform having mounted thereon a refrigeration plant, adapted for removing heat from a bulk storage container being borne on the platform and containing a beverage for cooling; and b. a beverage dispensing tap, connectable to the container, in fluid communication with the beverage, and mounted in thermally conductive relationship with the refrigeration plant, whereby the refrigeration plant removes heat from the dispenser in preparation for dispensing of the beverage, the refrigeration plant comprises:

a receptacle wherein the container is receivable for cooling an external surface of the container;

an evaporative cooling coil operatively located against and in thermally conductive relationship with a wall of the receptacle a refrigerant expansion chamber connected in thermally conducting relationship with a tubular conduit wherein the cooling coil is located on the outside of the receptacle wall, wherein the dispensing tap includes the tubular conduit passing through the receptacle wall; and wherein tubing through which refrigerant from the refrigerant plant flows is configured for selectively bypassing the expansion chamber.

2. A method of dispensing a chilled beverage, the method comprising the steps of:

a. providing chiller apparatus including:

i. a chilling receptacle adapted for receiving therein in cooling relationship a bulk storage beverage container containing a beverage for dispensing, and ii. a conduit connected to a dispensing tap, wherein the conduit and tap are in thermally conductive relationship with the chilling receptacle, wherein the chiller apparatus comprises a refrigerated cooling coil arranged in thermal contact with an outside surface of a wall of the receptacle, b. operating the apparatus to cause the receptacle to be cooled and to draw heat from the conduit and tap, c. placing the beverage container in the receptacle and allowing the container and its contents to cool, d. connecting the container and tap in fluid communication, e. operating the tap to dispense cooled beverage through the tap via the pre-cooled conduit, the conduit passes through the wall of the receptacle, and f. including causing refrigerant selectively to bypass the expansion chamber when cooling of the conduit is not required, wherein the chiller apparatus further comprises a refrigerant expansion chamber connected in thermally conducting relationship with the conduit.

3. The method of claim 2, wherein the chamber comprises a U-shaped tube having an inlet and an outlet respectively for receiving and discharging refrigerant.

4. The method of claim 2, including mounting the chilling apparatus on a wheeled platform.

5. A mobile beverage chiller comprising a chillable receptacle mounted on a wheelable platform, the receptacle adapted for receiving a bulk beverage dispensing container, a chilling device operatively mounted in thermally conductive contact with the receptacle, and beverage dispensing tap operatively connectable to the container and in thermally conductive relationship with the receptacle;

wherein the dispensing tap is in thermally conductive contact with a refrigerant expansion chamber connected to the chilling device; and a controllable bypass circuit operable to cause refrigerant to bypass the chamber.

6. The chiller of claim 5, wherein the receptacle comprises a sleeve into which the container is operatively locatable for chilling.

7. The chiller of claim 5, wherein the chilling device includes an evaporative cooling system located outside the receptacle.

8. The chiller of claim 5, wherein the expansion chamber comprises a U-shaped tube having legs between which the conduit is located to pass.

* * * * *